United States Patent
Ho et al.

(10) Patent No.: US 12,217,268 B2
(45) Date of Patent: Feb. 4, 2025

(54) SYSTEMS AND METHODS FOR DATA EXCHANGE USING PAYMENT CARDS WITH UNIVERSAL REFERENCE NUMBERS

(71) Applicant: Wells Fargo Bank, N.A., San Francisco, CA (US)

(72) Inventors: Peter Ho, Walnut Creek, CA (US); Brian M. Pearce, Pleasanton, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/387,370

(22) Filed: Nov. 6, 2023

(65) Prior Publication Data
US 2024/0078557 A1    Mar. 7, 2024

Related U.S. Application Data

(63) Continuation of application No. 17/222,286, filed on Apr. 5, 2021, now Pat. No. 11,810,124, which is a continuation of application No. 14/947,544, filed on Nov. 20, 2015, now Pat. No. 10,984,424.

(51) Int. Cl.
| | |
|---|---|
| *G06Q 30/01* | (2023.01) |
| *G06Q 20/20* | (2012.01) |
| *G06Q 40/10* | (2023.01) |
| *G06Q 40/12* | (2023.01) |

(52) U.S. Cl.
CPC ............ *G06Q 30/01* (2013.01); *G06Q 20/20* (2013.01); *G06Q 40/10* (2013.01); *G06Q 40/12* (2013.12)

(58) Field of Classification Search
CPC ........ G06Q 30/01; G06Q 40/12; G06Q 20/20; G06Q 40/10
See application file for complete search history.

(56) References Cited

U.S. PATENT DOCUMENTS

| | | | |
|---|---|---|---|
| 7,571,139 B1 * | 8/2009 | Giordano | G06Q 20/105 |
| | | | 705/40 |
| 2002/0143634 A1 | 10/2002 | Kumar et al. | |
| 2008/0223918 A1 | 9/2008 | Williams et al. | |
| 2011/0288923 A1 | 11/2011 | Steinert et al. | |
| 2015/0332414 A1 | 11/2015 | Unser et al. | |
| 2015/0348016 A1 | 12/2015 | Pearson et al. | |
| 2016/0267466 A1 * | 9/2016 | Kumnick | G07F 7/0806 |

* cited by examiner

*Primary Examiner* — A. Hunter Wilder
*Assistant Examiner* — Joseph M Mutschler
(74) *Attorney, Agent, or Firm* — Foley & Lardner LLP

(57) ABSTRACT

Methods and systems of exchanging data using payment cards with universal reference numbers are disclosed. A merchant computing system includes a merchant input/output assembly receiving a universal reference number from a customer at a point of sale. A merchant database retrievably stores a plurality of universal reference numbers and customer information associated with each of the plurality of universal reference numbers. A transaction circuit receives the universal reference number from the merchant input/output assembly, retrieves customer information associated with the universal reference number, and provides an output relating to a transaction based on the customer information.

20 Claims, 4 Drawing Sheets

SYSTEMS AND METHODS FOR DATA EXCHANGE USING PAYMENT CARDS WITH UNIVERSAL REFERENCE NUMBERS

CROSS REFERENCE TO RELATED APPLICATION

This application is a continuation of U.S. patent application Ser. No. 17/222,286 filed Apr. 5, 2021, which is a continuation of U.S. patent application Ser. No. 14/947,544 filed Nov. 20, 2015, each of which is incorporated herein by reference in its entirety.

BACKGROUND

Various merchants and service providers monitor, track, or use identifiers for individual customers to perform various functions specific to each customer. Identifiers may be used to link personalized information, such as records, billing information, preferences, access credentials, and so on. For example, a customer may be associated with a unique account number, which may be disposed on a plastic card. As customers go about using various merchants and service providers, customers may accumulate cards specific for each merchant and service provider.

SUMMARY

One embodiment relates to a merchant computing system. The system includes a merchant input/output assembly, a merchant database, and a transaction circuit. The merchant input/output assembly receives a universal reference number from a customer at a point of sale. The merchant database retrievably stores a plurality of universal reference numbers and customer information associated with each of the plurality of universal reference numbers. The transaction circuit receives the universal reference number from the merchant input/output assembly. The transaction circuit further retrieves customer information associated with the universal reference number from the merchant database. The transaction circuit provides an output relating to a transaction based on the customer information.

Another embodiment relates to a financial institution computing system. The financial institution computing system includes a financial institution database, a financial institution network interface circuit, and a data exchange circuit. The financial institution database retrievably stores a plurality of universal reference numbers and customer information associated with each of the plurality of universal reference numbers. The financial institution network interface circuit enables the financial institution computing system to exchange data over a network. The data exchange circuit receives a customer information request comprising a universal reference number from a merchant computing system over the network. The data exchange circuit further retrieves customer information associated with the universal reference number from the financial institution database. The data exchange circuit also enables an output relating to a transaction at the merchant computing system by transmitting the customer information to the merchant computing system over the network.

Yet another embodiment relates to a method. The method includes associating, by a data exchange circuit, customer information with a universal reference number of a customer and storing the association of the customer information with the universal reference number in a financial institution database. The method further includes transmitting, by the data exchange circuit, customer information retrieved from the financial institution database to a merchant computing system over the network in response to a customer information request relating to the universal reference number. The method includes executing, by the data exchange circuit, a transaction incorporating the customer information at the merchant computing system using a primary account number from a card network computing system received over the network.

DETAILED DESCRIPTION

Figure 1:
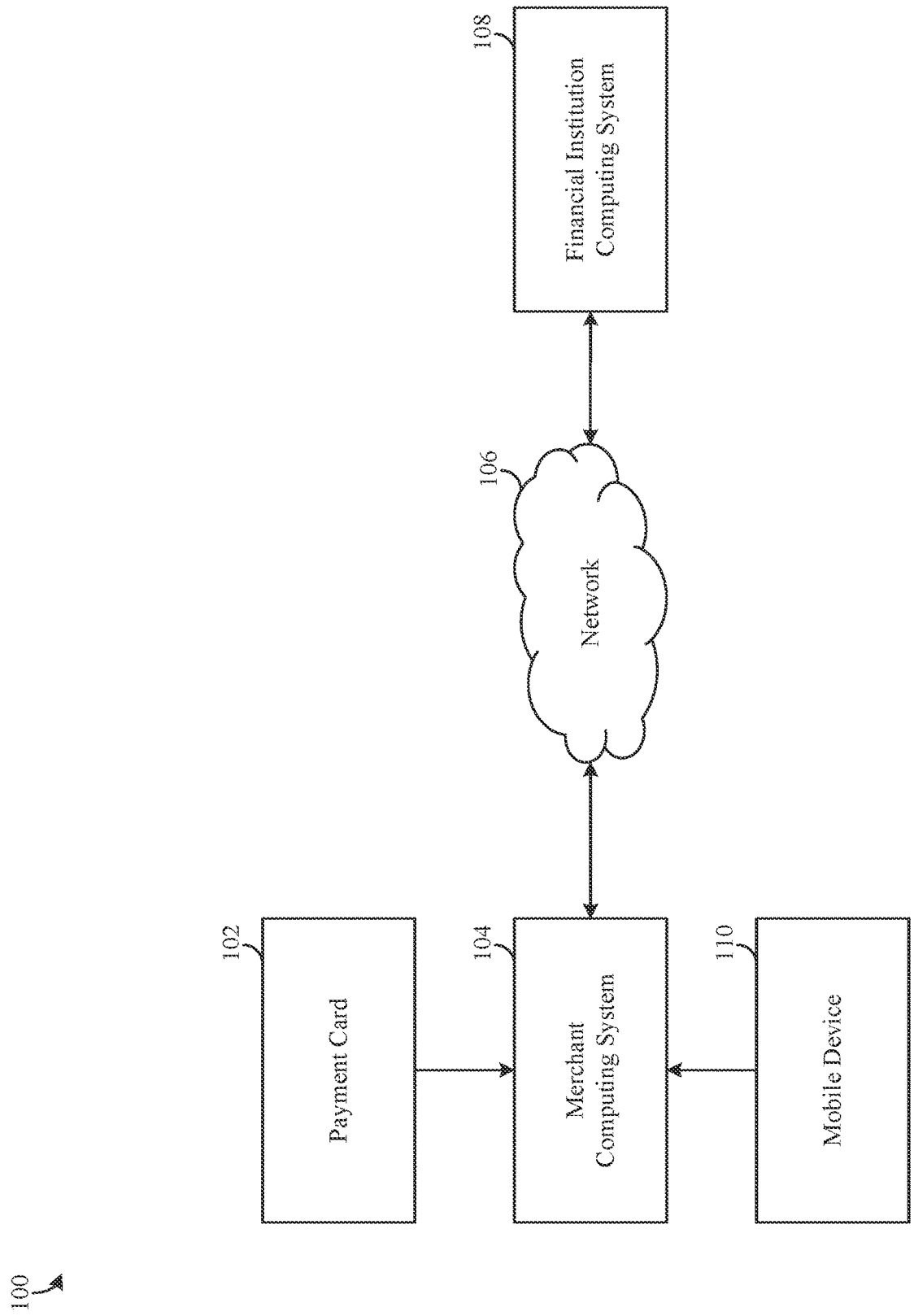
FIG. 1 is a block diagram illustrating a payment card data exchange system using universal reference numbers, according to an example embodiment.

Referring to FIG. 1, a data exchange system 100 includes a payment card 102, a merchant computing system 104, a financial institution computing system 108, and a mobile device 110. In some arrangements, the payment card 102 includes a chip, a magstripe, and a primary account number (a "PAN"). The PAN is an account number corresponding to a customer payment card account (e.g., a credit card, a debit card, a stored value card, etc.), and may be printed or embossed on the physical payment card 102 (e.g., along with a customer name, expiration date, security codes, etc.). The magstripe is a magnetically-responsive strip disposed on the back face of the payment card 102. The magstripe is configured to store a limited amount of information (e.g., a payment card account number, a customer name, expiration date, etc.).

The chip is a defining feature of the "smart" aspect of the payment card 102. The chip is a small circuitry system configured to exchange data with external systems (e.g., points of sale, personal computing devices, ATMs, etc.) via electrical contacts, RFID communication, NFC communication, or in another manner. The chip can be configured to be able to selectively transmit various types of information, including payment card information (e.g., account numbers, issuing entities, and so on). Such arrangements can be found in existing payment card functions provided by, for example, Visa payWave™, Mastercard PayPass™, and American Express ExpressPay™.

In some arrangements, the chip includes at least one universal reference number which may be transmitted to external systems. In some such arrangements, the universal reference number is a code that is unique to a given payment card 102. A universal reference number itself may not convey any actual information beyond identifying a corresponding payment card 102. That is, in some arrangements, the universal reference number is not an encrypted or obscured form of underlying data, but may instead be an identifier corresponding to remotely stored, useful data (e.g., payment and non-payment data). In some arrangements, user authentication may be required before universal reference number data may be accessed. As such, through data associations, universal reference numbers may be used to convey significantly more information than what can be stored on existing payment cards. In addition, customer information otherwise inconveniently kept on various cards, fobs, and the like may be maintained and used via association with one or more universal reference numbers.

The merchant computing system 104 is a computing system associated with a merchant with which a customer of the financial institution may transact. Examples of merchants include, for example, retailers, wholesalers, marketplace operators, service providers (e.g., loan servicers, cleaning services, transportation providers, digital wallet services, and so on), non-product or non-service based entities (e.g., governmental or regulatory entities) and so on. In some arrangements, the merchant computing system 104 is used to create and store data relating to customer transactions (e.g., purchases, refunds, preferences, etc.). In some such arrangements, the merchant computing system 104 can store databases of information relating to customers such as names, shipping addresses, contact information, preferences, and so on. Further, the merchant computing system 104 may be able to operate customer loyalty programs (e.g., membership programs, points programs, frequent shopper discounts, and so on). The merchant computing system 104 is configured to retrieve data (e.g., universal reference numbers) from the chip disposed on the payment card 102.

The financial institution computing system 108 is a computing system at a financial institution that is capable of maintaining customer accounts (e.g., payment card accounts) and databases of customer information. In the context of the present disclosure, the financial institution can include commercial or private banks, credit unions, investment brokerages, or the like. In some arrangements, universal reference numbers, corresponding data, and corresponding payment cards are managed by the financial institution computing system 108.

The merchant computing system 104 and the financial institution computing system 108 are configured to exchange data over a network 106. The network 106 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 106 includes the internet.

The mobile device 110 is a computing system associated with a customer of the financial institution. The mobile device 110 includes one or more processors and non-transitory storage mediums housing one or more logics configured to allow the mobile device 110 to exchange data over the network 106, execute software applications, access websites, generate graphical user interfaces, and perform other similar functionalities. Examples of the mobile device 110 include laptop computers, tablets, smartphones, wearable computing devices such as eyewear, and the like.

In operation, a customer associated with the financial institution of the financial institution computing system 108 presents the payment card 102 to the merchant computing system 104. A reader at the merchant computing system 104 retrieves information from the chip on the payment card 102. In some arrangements, the merchant computing system 104 retrieves a universal reference number from the chip. In some arrangements, a database associated with the merchant computing system 104 retrievably stores information corresponding to the retrieved universal reference number. In one such arrangement, the merchant computing system 104 can locally retrieve information corresponding to that universal reference number. In another arrangement, the merchant computing system 104 can retrieve information corresponding to that universal reference number from the financial institution computing system 108 over the network 106.

In some arrangements, regardless where information corresponding to a given universal reference number is located, additional authentication procedures may be performed before the corresponding information is retrieved or used. For example, a customer may be asked to provide a personal identification number (a "PIN"), biometric data (e.g., a fingerprint), an answer to a security question, etc. before information corresponding to a universal reference number may be retrieved or used. As another example, the merchant computing system 104 may be configured to seek an authorization from the financial institution computing system 108 to retrieve or use the corresponding information (e.g., to confirm that the payment card 102 was not lost, stolen, or is otherwise being fraudulently used).

The universal reference number may be associated with any of a plurality of information types. In one example, where the merchant computing system 104 is operated by a hotel, a universal reference number may be associated with a customer's name, contact information (e.g., phone number and e-mail address), and billing information (e.g., available or preferred payment types). In addition, the universal reference number may be associated with the customer's lodging preferences, for example, non-smoking rooms with two queen beds and a late checkout. In one arrangement, the merchant computing system 104 may be updated by a hotel representative after each customer interaction to store customer preferences. In another arrangement, the hotel may provide a software application or a website to allow customers to configure their own accommodation preferences, which may be stored at the merchant computing system 104. Further, the universal reference number may be associated with a security device at an assigned hotel room. As such, for example, upon associating the universal reference number with the assigned hotel room at the merchant computing system 104, the customer may be able to use the payment card 102 to gain access to the assigned room (e.g., using a networked payment card reader at the hotel room to unlock the door).

In another example, where the merchant computing system 104 is operated by a healthcare provider (e.g., a hospital), the universal reference number may be associated with a customer's medical records. As such, in operation, a customer may present the payment card 102 to hospital staff with access to the merchant computing system 104. The hospital staff may authenticate the payment card 102 and confirm the customer's identity (e.g., via a traditional driver's license, or some other avenue of identification). The hospital staff may then use the merchant computing system 104 to associate a universal reference number retrieved from the payment card 102 with medical records corresponding to the customer (e.g., insurance information, family physician, known allergies, test results, family histories, etc.). As such, the customer can subsequently visit a healthcare provider associated with the merchant computing system 104 and simply use the payment card 102 to provide the healthcare provider with relevant medical information. In some arrangements, the merchant computing system 104 uploads the universal reference number and the corresponding medical records to a remote third party storage location (e.g., at the financial institution computing system 108). In one such an arrangement, after the medical records have been uploaded, the customer may visit another healthcare provider (i.e., independent of the previously-visited healthcare provider) who can use the payment card 102 to retrieve the medical records from the remote third party storage location.

In yet another example, where the merchant computing system 104 is operated by a public transit provider (e.g., subway, train, or bus transportation), a customer may associate a universal reference number with a preferred payment account with the public transit provider. In one arrangement, where passengers may pay fares for individual trips, the universal reference number may be associated with a preferred method of payment (e.g., the payment card account associated with the payment card 102 itself, a checking account, another payment card, etc.). In such an arrangement, the customer may only need to cause the merchant computing system 104 to read a chip on the payment card 102 to pay for a fare. In another arrangement, where passengers may pay for multi-ride pass (e.g., a 10-ride pass) or time-limited passes (e.g., a one-month pass), the customer may associate a universal reference number with such a pass, such that the payment card can be used as the pass. Further, in one such arrangement, the customer may associate a universal reference number with a preferred pass and method of payment, such that a new pass is provisioned upon the expiration of the associated pass. In addition, the universal reference number may be associated with preferred routes and/or frequent destinations. As such, the customer may be able to quickly select a destination and submit a payment to purchase a transit ticket via the universal reference number. Further, in arrangements where universal reference numbers and associated information is stored at a networked third party storage location, route, destination, and payment information may be retrieved at various transit providers (e.g., where the customer associated a preferred route and destination at a bus transportation provider, such information may be retrieved at a train transportation provider). As one of skill in the art would recognize, the examples discussed above are but a few of many possible uses of the systems and methods disclosed herein.

Individual universal reference numbers may be associated with different information types at different vendors. In one arrangement, the payment card 102 includes one universal reference number. As such, merchant computing systems may associate the same universal reference number with a customer's preferences at a hotel, the customer's medical records at a healthcare provider, and a payment account with the public transit provider. In another arrangement, the payment card 102 includes multiple universal reference numbers, where each universal reference number is used by a specific type of merchant. In one such arrangement, a first universal reference number may be used by merchant computing systems at a plurality of hotels to identify a customer's preferences at each of the plurality of hotels. A second universal reference number may be used by merchant computing systems at a plurality of clothing retailers to retrieve customer sizes and color preferences. A third universal reference number may be used by merchant computing systems at a plurality of restaurants to retrieve customer dietary restrictions, seating preferences, etc. Thus, in such an arrangement, a given universal reference number on the payment card 102 may be used by several merchants within the same class of merchants (e.g., hotels, retailers, restaurants, etc.) and provide the same information to each merchant within the class of merchants.

In some arrangements, information associated with one or more universal reference numbers is stored at a remote third party storage location (e.g., the financial institution computing system 108). Thus, in some arrangements, the merchant computing device 104 may be configured to request universal reference number information from the financial institution computing system 108 over the network 106.

To specify relevant universal reference number information, the merchant computing system may include both the universal reference number and a merchant category code in a request to the financial institution computing system 108. A merchant category code is a code the financial institution computing system 108 can use to identify the type of goods or services provided by a specific merchant (e.g., Merchant Category Codes, as published by the Internal Revenue Service). The financial institution computing system 108 may store information sufficient to identify merchants from merchant category codes, as well as relevant customer information based on identified merchants and universal reference numbers. In other words, the financial institution computing system 108 may be able to identify and retrieve subsets of information associated with a given universal reference number by using merchant category codes. The financial institution computing system 108 may then transmit the relevant universal reference number information to the merchant computing system 104.

In operation, for example, a customer may associate hotel room preferences with the payment card 102 while booking a room at a first hotel (e.g., a facility associated with a first hotel chain). The merchant computing system 104 at the first hotel may transmit a merchant category code for hotels, a universal reference number from the payment card 102, and room preferences to the financial institution computing system 108. The financial institution computing system 108 may then associate the room preferences with the universal reference number and the merchant category code for hotels. Subsequently, the customer may provide the payment card 102 to the merchant computing system 104 at a second hotel (e.g., a facility associated with a second hotel chain). The merchant computing system 104 at the second hotel may then transmit the universal reference number from the payment card 102 and the merchant category code for hotels to the financial institution computing system 108, and receive customer room preferences (i.e., as determined from the previous visit to the first hotel) in return. The merchant computing system 104 at the second hotel may then assign the customer a room in accordance with the room preferences received from the financial institution computing system 108. In addition, the merchant computing system 104 at the second hotel may also associate the payment card 102 with an electronic door lock and card reader at the customer's assigned room, allowing the customer to gain access to the assigned room by using the payment card 102. Despite the limited amount of storage on the payment card 102, all of the above operations may be completed using only the universal reference number (e.g., instead of storing each specific preference and door lock data on the payment card 102).

Figure 2:
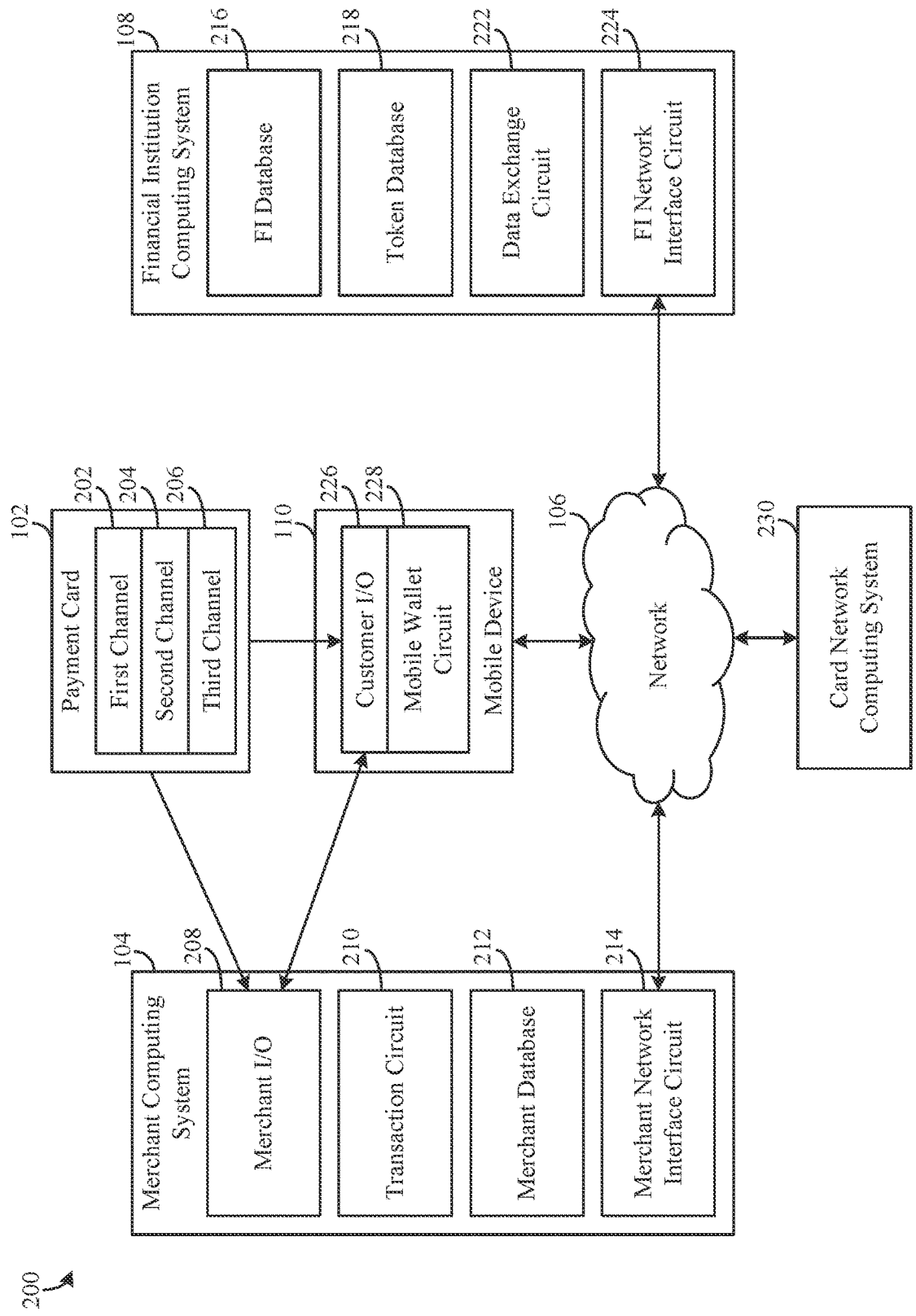
FIG. 2 is a block diagram illustrating additional features of the payment card data exchange system shown in FIG. 1.

Referring now to FIG. 2, a more detailed system 200 includes additional features and details of the data exchange system 100 of FIG. 1. In the more detailed system 200, the payment card 102 includes a chip having a first channel 202, a second channel 204, and a third channel 206. In some arrangements, each of the first channel 202, second channel 204, and the third channel 206 includes discrete data that the merchant computing system 104 may retrieve independently of the other channels. In some such arrangements, each channel includes data that may be retrieved by a distinct data transfer protocol (e.g., various radio frequency protocols, including proprietary protocols specific to each channel).

Various other arrangements of the more detailed system 200 may include payment cards with more or less than three channels.

In some arrangements, some or all of the channels on the payment card 102 are assigned a different security level corresponding to the sensitivity of the underlying data. For example, the first channel 202 may be assigned a low level of security, and may only contain a universal reference number corresponding to a customer name, phone number, and e-mail address, or other readily available public information. As such, information in the first channel 202 may be retrieved without any additional authentication procedures. For example, data transmission protocols at the merchant computing system 104 for retrieving information on the first channel 202 may retrieve the customer name, phone number, and e-mail address to register the customer for a merchant loyalty program.

Information on the second channel 204 may include a universal reference number at a medium level of security. In one arrangement, the universal reference number is associated with a medium level of security that prompts the merchant computing system 104 to perform one or more supplemental authentication procedures before retrieving or using information corresponding to the universal reference number. As such, a data transmission protocol at the merchant computing system 104 for retrieving information on the second channel 204 may retrieve the universal reference number. The medium level security association would then cause the merchant computing system 104 to perform one or more authentication procedures (e.g., entry of a customer PIN, entry of biometric data, review of a second form of identification, seeking confirmation from a corresponding financial institution, and so on) before retrieving or using information corresponding to the universal reference number. In such an arrangement, the security level corresponding to the second channel 204 may be determined by the financial institution that issued the payment card 102 (e.g., increasing levels of security based on increasing purchase transaction values).

Information on the third channel 206 may be associated with a high level of security. For example, the third channel 206 may include a universal reference number associated with particularly sensitive information (e.g., medical records, social security numbers, etc.). As such, a high level of security may be associated with the universal reference number, requiring more thorough security checks or multiple layers of authentication that the medium level of security. Further, in some arrangements, the data transmission protocol may be proprietary and specifically configured to retrieve data from the third channel 206 of a payment card 102 belonging to a specific customer. Retrieving or using information on the third channel 206 may be conditioned on one or more authentication procedures intended for particularly sensitive information.

The mobile device 110 includes a customer input and output device (an "I/O") 226 and a mobile wallet circuit 228. The customer I/O 226 includes hardware and associated logics configured to enable the mobile device 110 to exchange information with a customer and the merchant computing system 104 (e.g., via the merchant I/O 208 discussed below). An input aspect of the customer I/O 226 allows the customer to provide information to the mobile device 110, and can include, for example, a mechanical keyboard, a touchscreen, a microphone, a camera, a fingerprint scanner, any user input device engageable to the customer device 104 via a USB, serial cable, Ethernet cable, and so on. In turn, an output aspect of the customer I/O 226 allows the customer and the merchant computing system 104 to receive information from the mobile device 110, and can include, for example, a digital display, a speaker, illuminating icons, LEDs, and so on. Further, the customer I/O 226 may be configured to include assemblies that serve both input and output functions, for example radio frequency transceivers (e.g., RF or NFC-based transceivers) and other short range wireless transceivers (e.g., Bluetooth™, laser-based data transmitters, etc.).

The mobile wallet circuit 228 may include program logic executable by the mobile device 110 to implement at least some of the functions described herein. The mobile wallet circuit 228 may provide an interface that is configured to receive and display mobile web pages (e.g., web pages provided on the customer I/O 226 prompting the user to provide information to create an account, web pages displaying account balance information and past transactions, and so on) received from a mobile wallet bank computer system (not shown). In operation, while setting up a mobile wallet account, the mobile wallet circuit 228 may receive, organize, and store payment tokens from the payment card 102 or the card network computing system 230. The mobile wallet circuit 228 may then transmit certain payment tokens to the merchant computing system 104 (e.g., via the customer I/O 226) as part of a transaction.

The mobile wallet circuit 228 may be used in connection with merchant computing system 104 at a brick and mortar store location. Additionally, the mobile wallet circuit 228 may also be used in connection with online merchant transactions (e.g., via a webpage or a merchant app).

The mobile wallet circuit 228 may allow users to choose any one of the accounts for transferring funds to the merchant for goods or services. An account holder may select an account (e.g., and a corresponding payment token) that is used to make payments by default. The account holder may use account selection logic to select the account the account holder wants to use to pay the merchant or other recipient.

In the more detailed system 200, the merchant computing system 104 may include a merchant input/output assembly (a "merchant I/O") 208, a transaction circuit 210, a merchant database 212, and a merchant network interface circuit 214. In some arrangements, components of the merchant computing system 104 may be communicatively engaged to one another but distributed throughout an area or a facility, such that certain operations of the merchant computing system 104 may be performed in one location while other operations are performed elsewhere. For example, the merchant I/O 208 may be disposed at a point of user contact (e.g., a kiosk, a terminal, a gate, a touchpad, etc.) while the other components are disposed at a remote computing facility.

The merchant I/O 208 includes hardware and associated logics configured to enable a merchant to exchange information with a customer and the payment card 102. An input aspect of the merchant I/O 208 allows the merchant or a customer to provide information to the merchant computing system 104, and can include, for example, a card reader (e.g., a contact or contactless chip reader, an RF or NFC-based receiver, a magstripe reader, etc.), a mechanical keyboard, a touchscreen, a microphone, a camera, a fingerprint scanner, or any user input device engageable to the merchant computing system 104 (e.g., via USB, Bluetooth, WiFi, and so on). In turn, an output aspect of the merchant I/O 208 allows the merchant or the customer to receive information from the merchant computing system 104, and can include, for example, a digital display, a speaker, illuminating icons, LEDs, and so on.

The merchant database 212 allows the merchant computing system 104 to retrievably store customer information relating to various operations discussed herein, and may include non-transient data storage mediums (e.g., local network servers) or remote data storage facilities (e.g., cloud servers). The merchant database 212 may include any of various types of customer information, such as personal information (e.g., names, addresses, phone numbers, and so on), identification or authentication information (e.g., driver's license numbers, biometric data, answers to security questions, and so on), and customized customer information (e.g., billing information, lodging preferences, room assignments, authorizations, clearances, etc.). Further, the merchant database 212 may include universal reference number libraries, where universal reference numbers and their associations (i.e., customer information) may be stored and retrieved later on.

In addition, in some arrangements, the merchant database 212 may also be configured to store tokens. In example embodiments, payment tokens may be surrogate values that replace the PAN associated with a payment card, such as a credit card, debit card, stored value card, etc. Payment tokens may pass basic validation rules of an account number. Hence, the payment token for a credit card in many respects "looks like" a real credit card number, but in fact is only a token. As part of the token generation process, steps are taken such that the generated payment token does not have the same value or otherwise conflict with a real primary account number (e.g., a real credit card number). Payment tokens may be provisioned to various locations for use in various types of payment scenarios, including remote storage at a merchant (e.g., a card-on-file database) for on-line transactions with the merchant, a secure storage element ("secure element") located in a payment card for a point-of-sale transaction using the payment card, local device storage (e.g., internal memory of a mobile device) for a mobile/digital wallet transaction, and so on.

In example embodiments, to process payment transactions, a payment is processed using a payment token in lieu of a primary account number (e.g., the 16-digit account number on the front of a credit card). The merchant may first obtain the payment token from a mobile device 110 or from the payment card 102, and then submits the payment token through a payment network to a card network computing system 230 (e.g., Visa®, MasterCard®, American Express®, Discover®, Diners Club®, etc.). In some arrangements, the payment token is also stored in the merchant database 212. The card network computing system 230 detokenizes the payment token to obtain the PAN, i.e., replaces the payment token for its associated PAN value based on the payment token-to-PAN mapping information stored in a token database (sometimes referred as a "token vault"). The card network computing system 230 then transmits the PAN to the card issuer (e.g., the financial institution computing system 108) for processing in a manner similar to a traditional credit card transaction. For example, the financial institution computing system 108 may approve the transaction, in which case the transaction with the merchant is completed and payment to the merchant is made. The token database at the card network computing system 230 may also maintain other information that may be used to apply restrictions or other controls during transaction processing.

In example embodiments, processing payment transactions using such payment tokens provides enhanced security in connection with the payment card transactions. The payment tokens may be limited to use, e.g., only in connection with a specific merchant or a specific channel (e.g., payment via a specific mobile wallet). For example, in the event of a data breach at a merchant, the risk of subsequent fraud is reduced because only the payment tokens are exposed instead of primary account numbers. In this example, the payment tokens are merchant-specific and therefore cannot be used at other merchants.

The payment token may be included in information associated with a universal reference number. For example, a single universal reference number on the payment card 102 may be used to retrieve a set of customer preferences and a preferred method of payment (i.e., the payment token) from the merchant database 212. As such, the customer may use the payment card 102 to provide the universal reference number to use the preferred method of payment and apply the set of customer preferences at the merchant computing system 104.

The transaction circuit 210 in some arrangements is a circuit configured to retrieve, authenticate, and utilize data from the payment card 102. As used herein, each "circuit" may include program logic executable by hardware disposed at a computing system to implement at least some of the functions described herein. For example, for a mobile point of sale (e.g., using the Square® card reader), in order to make the transaction circuit 210, a provider (e.g., a software developer or publisher, or a financial entity itself) can make a software application available to be placed on the merchant computing system 104. A software developer may make the software application available to be downloaded (e.g., via the developer's website, via a digital marketplace, or in another manner). Responsive to a user selection of an appropriate link, the software application can be transmitted to the merchant computing system 104 and cause itself to be installed on the merchant computing system 104. Installation of the software application creates the transaction circuit 210 on the merchant computing system 104. Specifically, after installation, the thus-modified merchant computing system 104 includes the transaction circuit 210 (e.g., embodied as a processor and instructions stored in non-transitory memory that are executed by the processor, along with other hardware and associated logics depending on operations performed by a given circuit). In other arrangements, the transaction circuit 210 may be made by installing one or more plugins at an existing point of sale (e.g., a retail checkout terminal). In yet other arrangements, the transaction circuit 210 can include a portal to a remote computing system configured to perform at least some of the operations discussed with respect to the transaction circuit 210, which may be made available to the merchant computing system 104. Other circuits discussed herein may be implemented in a similar fashion.

In some arrangements, the transaction circuit 210 is configured to complete operations relating to universal reference numbers. For example, the transaction circuit 210 may receive a universal reference number from the merchant I/O 208, and access the merchant database 212 to determine whether any customer information is associated with the universal reference number (e.g., customer preferences, personal information, etc.). Alternatively, the transaction circuit 210 may request customer information associated with the universal reference number from the financial institution computing system 108. In some such arrangements, a request may include the universal reference number, a merchant category code, and information relating to a transaction type. Further, the request may also include authentication information (e.g., a PIN, biometric data, etc.). As such, the financial institution computing system 108 may be able to identify the customer and/or the payment card 102 (e.g., via the universal reference number), the type of merchant associated with the merchant computing system 104 (e.g., via the merchant category code), and relevant information for a given transaction (e.g., via the transaction type information). The financial institution computing system 108 may also be able to authenticate the request using authentication information included in the request.

In addition, the transaction circuit 210 may be able to associate new information with a universal reference number. In one arrangement where the merchant is a hotel, the transaction circuit 210 may be able to associate customer rooming preferences (e.g., as received by a front desk representative) and a room lock code to a universal reference number, and store such information in the merchant database 212. In some arrangements, the transaction circuit 210 provides the customer rooming preferences to the financial institution computing system 108, allowing other hotels to retrieve and use such preferences.

The merchant network interface circuit 214 is configured to allow the merchant computing system 104 and the various components therein to exchange data over the network 106. For example, where the transaction circuit 210 determines that an authentication process requires input from the financial institution computing system 108, the merchant network interface circuit 214 allows the transaction circuit 210 to exchange data with the financial institution computing system 108 remotely over the network 106.

In operation, in some arrangements, the transaction circuit 210 may cooperate with the merchant I/O 208 to allow a customer to selectively employ information associated with universal reference numbers stored on the payment card 102 in a given transaction. In one such arrangement, the customer transmits a universal reference number from the payment card 102 to the transaction circuit 210 via the merchant I/O 208. The transaction circuit 210 may exchange the universal reference number with the merchant database 212 or the financial institution computing system 108 to retrieve high-level information associated with the universal reference number, which may be presented as a menu of options for the customer on the merchant I/O 208. For example, where the merchant computing system 104 is operated by a hotel, the universal reference number may be associated with both a "Business Trip" customer preference profile (e.g., a single bed room with a WiFi package), and a "Family Vacation" customer preference profile (e.g., two queen beds and a group brunch voucher) in the merchant database 212. Upon receiving the universal reference number from the payment card 102, the transaction circuit 212 may retrieve and present options corresponding to the "Business Trip" and the "Family Vacation" profiles on a display (i.e., the merchant I/O 208). The customer may then select a desired preference profile via the merchant I/O 208 (e.g., a touchscreen display), and the transaction circuit 210 may retrieve and apply the set of preferences corresponding to the selected preference profile. In various arrangements, the transaction circuit 210 may be configured to allow the customer to update or change a given preference profile, or add new preference profiles. As such, in some arrangements, customers are able to select, adjust, or add information associated with a given universal reference number at the merchant computing system 104.

In the more detailed system 200, the financial institution computing system 108 includes an FI database 216, a token database 218, a data exchange circuit 222, and an FI network interface circuit 224. Similar to the merchant network interface circuit 214, the FI network interface circuit 224 is configured to allow the financial institution computing system 108 and the various components therein to exchange data over the network 106.

Similar to the merchant database 212, the FI database 216 allows the financial institution computing system 108 to retrievably store customer information relating to the various operations discussed herein. The FI database 202 includes customer information that may be associated with universal reference numbers. For example, the FI database 202 may include personal information (e.g., names, addresses, phone numbers, and so on), identification or authentication information (e.g., driver's license numbers, biometric data, answers to security questions, and so on), and customer financial information (e.g., account numbers, account balances, available credit, credit history, transaction histories, and so on). The FI database 216 may also include information associated with universal reference numbers within each payment card provided to each customer.

The token database 218 is a storage medium for token information. The token database 218 may be a token vault that is maintained by the financial institution computing system 108. In some embodiments, the payment tokens are generated by a card network computing system, and payment token-to-PAN mapping information is maintained by the card network computing system; and, in addition, the payment token-to-PAN mapping information is also maintained by the financial institution computing system 108.

The data exchange circuit 222 exchanges data with other components of the financial institution computing system 108 to supplement the operation of the transaction circuit 210. For example, in operation, the data exchange circuit 222 may receive an information request from the merchant computing system 104 over the network 106. The information request may include any of a universal reference number, a merchant category code, a payment token, information relating to a transaction type, and authentication information. By accessing the FI database 216, the data exchange circuit 222 may look up the universal reference number and retrieve associated information, identify the merchant from the merchant category code, and authenticate the request. The data exchange circuit 222 may further transmit information responsive to the information request back to the merchant computing system 104 over the network 106 via the FI network interface circuit 224.

The data exchange circuit 222 may be configured to generate and store universal reference number associations in the FI database 216. For example, an information request received from the merchant computing system 104 may include additional customer information (e.g., additional or new customer product or service preferences, preferred methods of payment, etc.) that is not in the FI database 216. The data exchange circuit 222 may associate the additional customer information received with a universal reference number in the information request (e.g., a product type and a payment token for a merchant type) and update the FI database 216 accordingly. As such, the data exchange circuit 222 may include the additional customer information in a response to a subsequent information request relating to the universal reference number (e.g., from the same merchant or a different merchant).

In addition, in some arrangements, the data exchange circuit 222 completes one or more fraud detection measures after receiving a universal reference number. In some such arrangements, the fraud detection measures are similar to those measures taken to detect credit card fraud. In one arrangement, the data exchange circuit 222 may be configured to monitor locations from which the universal reference number is transmitted. For example, if the universal reference number is first received from a merchant in the customer's home town on the east coast and subsequently received from another merchant on the west coast an hour later, the data exchange circuit 222 may flag the transaction with the merchant on the west coast as potentially fraudulent and decline to transmit universal reference number information. In another arrangement, the data exchange circuit 222 may be configured to determine whether a received merchant category code is unusual compared to merchant category codes in a transaction history of the customer (e.g., as stored in the FI database 216). The data exchange circuit 222 may apply various other fraud monitoring approaches as well.

In some arrangements, the data exchange circuit 222 receives a payment token from the merchant computing system 104 over the network 106, and then forwards the payment token to the card network computing system 230 for detokenization. In some such arrangements, the card network computing system 230 previously generated the payment token for a PAN, associated the payment token with a permission (e.g., a payment card account and a permission allowing a merchant corresponding to the merchant computing system 104 to receive payments from the payment card account), and disposed the token on the payment card 102 or the mobile device 110. In some arrangements, the chip on the payment card 102 is configured to dynamically generate a new token each time the chip is read (e.g., at the merchant I/O 208). In such arrangements, the card issuer computing system 230 maintains information relating to a token generation algorithm used by the chip to dynamically generate payment tokens. As such, the card issuer computing system 230 may be able to identify a PAN based on the algorithm employed to create the corresponding payment token.

In operation, the card issuer computing system 230 may provide a PAN resulting from a detokenized payment token to the data exchange circuit 222, and the data exchange circuit 222 may authorize a payment transaction to the merchant associated with the merchant computing system 104.

As one skill in the art would recognize, the data exchange circuit 222 may perform other related functions and combinations of the functions in the examples provided above, using universal reference numbers and/or tokens. For example, in some arrangements, a merchant-specific payment token is treated as a universal reference number. In one such arrangement, the data exchange circuit 222 may receive a merchant-specific payment token from the merchant computing system 104 instead of a universal reference number. The merchant-specific payment token may be provisioned by the card network computing system 230 to the mobile wallet circuit 228. In such an arrangement, the data exchange circuit 222 may be configured to treat the merchant-specific payment token as a universal reference number in addition to using the merchant-specific payment token to complete a payment transaction. In other words, the data exchange circuit 222 may store the merchant-specific payment token in the FI database 216, associate one or more customer preferences with the merchant-specific payment token, and complete a payment transaction using the merchant-specific payment token. As such, the data exchange circuit 222 may retrieve the one or more associated customer preferences from the FI database 216 if the data exchange circuit 222 receives the merchant-specific payment token from the merchant computing system 104 for a later transaction.

Figure 3:
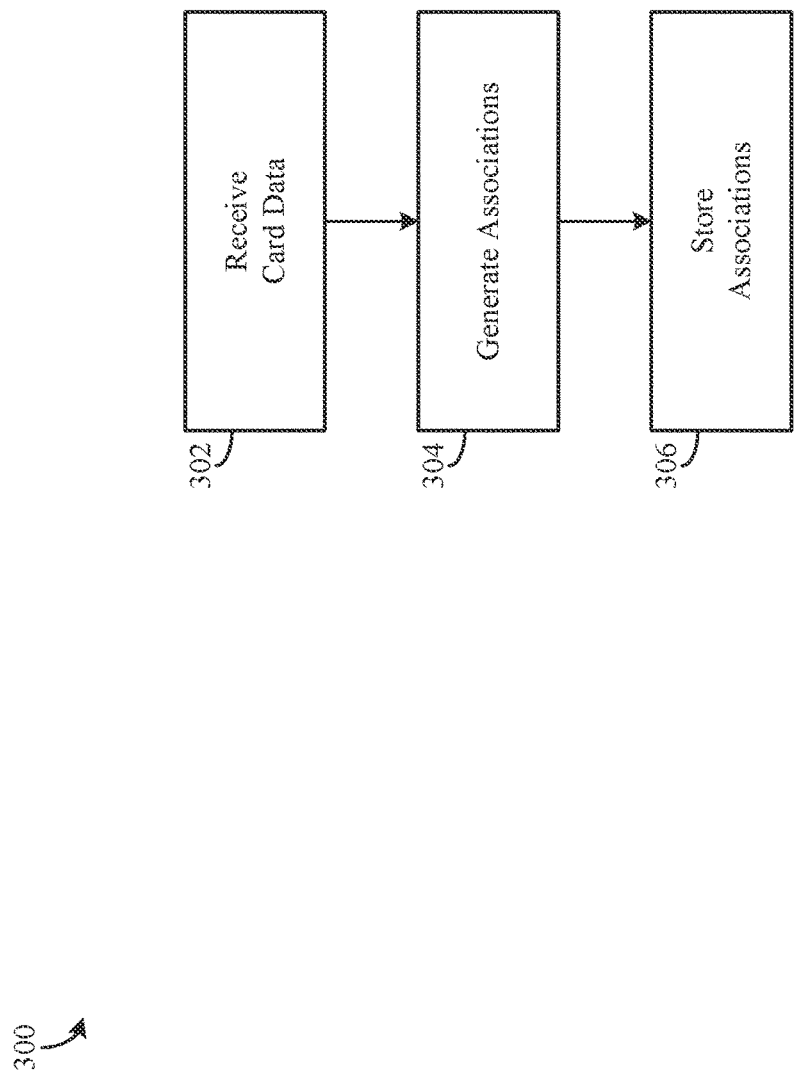
FIG. 3 is a flowchart of a method of exchanging data using payment cards with universal reference numbers, according to an example embodiment.

Referring now to FIG. 3, a method 300 of exchanging data using payment cards (e.g., the payment card 102) with universal reference numbers is shown. The method 300 may be performed by processing and storage hardware at a financial institution computing system (e.g., the financial institution computing system 108) or a merchant computing system (e.g., the merchant computing system 104), as executed by one or more circuits configured to perform the functions described below.

At 302, card data is received. Payment card data may be received by a data exchange circuit (e.g., the data exchange circuit 222) over a network (e.g., the network 106). Payment card data may be received from a merchant computing system (e.g., the merchant computing system 104). For example, a transaction circuit at the merchant computing system (e.g., the transaction circuit 210) may cooperate with a merchant I/O (e.g., the merchant I/O 208) to receive a universal reference number from a payment card (e.g., the payment card 102) or a customer mobile device (e.g., the mobile device 110).

The card data received at 302 may be transmitted by a plurality of merchants and yet contain the same universal reference number. In some arrangements, the universal reference number is associated with a common type of customer information (e.g., a name and contact information), and as such, there may not be a need to distinguish merchants before providing associated customer information. In other arrangements, the same universal reference number is associated with a plurality of customer information types depending on the requesting merchant. In some such arrangements, the card data received at 302 may include a merchant category code that allows the data exchange circuit to identify a merchant type (e.g., using the FI database). As such, a plurality of customer information types associated with the same universal reference code may be distinguished by a corresponding plurality of merchant category codes.

At 304, associations are generated. In some arrangements, a data exchange circuit at the financial institution computing system (e.g., the data exchange circuit 222) may associate information (e.g., identifying customer information, customer preferences for various categories of merchants, etc.) with the universal reference number. Further, in some arrangements, information associated with the universal reference number may be allocated to various merchant category codes. As such, for example, a first set of information may be associated with the universal reference number and a first merchant category code, and a second set of information may be associated with the universal reference number and a second merchant category code. The associations may be stored at 306, for example at the FI database 216.

Figure 4:
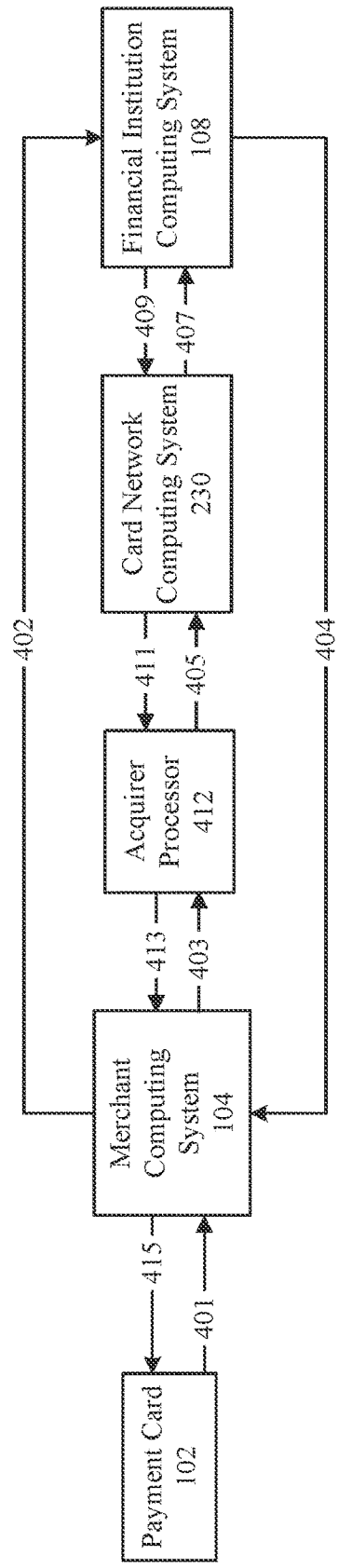
FIG. 4 is a flowchart of a method of completing transactions using payment cards with universal reference numbers, according to an example embodiment.

FIG. 4 illustrates a process 400 that may be implemented by the system of FIGS. 1-2. By way of example, FIG. 4 shows a transaction flow that includes universal reference numbers. As will be appreciated, the systems of FIGS. 1-2 support other types of transactions as well, such as mobile wallet transactions.

A user may use the payment card 102 to transact with a merchant. The user may be located at a merchant location and may wish to pay for a good or service, or the user may be located away from the merchant location or be engaged in an online transaction. At step 401, the payment card 102 may transmit a universal reference number and, in some arrangements, a payment token to merchant computing system 104 (e.g., via RFID, NFC, or other method).

In other embodiments, the universal reference number and the payment token are transmitted from a mobile device. The universal reference number and the payment token may be provisioned to a mobile device (e.g., the mobile wallet circuit 228 of the mobile device 110) in advance of a given transaction and is reused for many mobile wallet transactions. In some embodiments, the payment token and the universal reference number is dynamically provisioned to the mobile wallet circuit 228. For example, when the user selects the "transact" button, the mobile wallet circuit 228 may send a request to a mobile wallet computing system (not shown) which, in response, provisions a one-time payment token and a universal reference number to the mobile wallet circuit 228. The mobile wallet circuit 228 may then provide the payment token and the universal reference number to the merchant computing system 104 at 401.

In arrangements that include the mobile wallet circuit 228 on the mobile device 110, a single universal reference number and associations therewith may be used in transactions involving various different payment cards from various different card issuing entities. For example, in some arrangements, the universal reference number may be provided from a first payment card (e.g., issued by a first financial institution) to the mobile wallet circuit 228, and thereafter may be used in conjunction with payment tokens associated with the first payment card as well as a second payment card from a second financial institution. In operation, the mobile wallet circuit 228 may transmit the universal reference number along with a first payment token (e.g., associated with the first payment card) to a first merchant in a first transaction, and the universal reference number with a second payment token (e.g., associated with the second payment card) to a second merchant in a second transaction. In such an arrangement, for example where the first merchant and the second merchant share a common merchant category, preferences associated with the universal reference number over the course of the first transaction (e.g., as discussed with respect to the method 300) may also be retrieved and used in the second transaction despite the use of different methods of payment (i.e., the first payment token at the first merchant and the second payment token at the second merchant).

In yet other arrangements, a payment token received from the payment card 102 at 401 may serve as both a payment token and a universal reference number. For example, the payment card 102 may be issued by a first financial institution that does not support transaction flows with universal reference numbers (e.g., issues payment cards without universal reference numbers). In such an arrangement, the merchant computing system 104 may be configured to exchange data with a second financial institution associated with the financial institution computing system 108 (i.e., which does support transaction flows with universal reference numbers) during each transaction. The merchant computing system 104 may be configured to transmit the payment token as a universal reference number to the financial institution computing system 108 (i.e., to the second financial institution) to retrieve any customer information associated with the payment token itself (e.g., at 402, discussed below). The financial institution computing system 108 may then transmit information associated with the payment token to the merchant computing system 104 (e.g., at 404, discussed below). In addition, the merchant computing system 104 may transmit new information to be associated with the payment token to the financial institution computing system 108 for future transactions. As such, the process 400 may be used in arrangements with payment cards that do not store universal reference numbers.

At step 402, the merchant computing system 104 transmits the universal reference number received at 401 to the financial institution computing system 108 (e.g., over the network 106). A data exchange circuit (e.g., the data exchange circuit 222) at the financial institution computing system 108 retrieves relevant information associated with the universal reference number from a financial institution database (e.g., the FI database 216). In some arrangements, a merchant category code is included with the universal reference number received at 401 and transmitted at 402.

At 404, the data exchange circuit at the financial institution computing system 108 transmits information associated with the universal reference number to the merchant computing system 104 (e.g., over the network 106). The information includes information relating to a preferred transaction for the customer at the merchant computing system 104. In some arrangements, the data exchange circuit retrieves information associated with both the universal reference number and the merchant category code from the financial institution database. The information retrieved may include customer preferences for a given merchant category, such as preferred products or services (e.g., sizes, colors, types, etc.) and/or preferred methods of payment (e.g., payment tokens), for example as stored in the FI database 216 in the method 300. In addition, the data exchange circuit may be configured to perform one or more fraud checks before retrieving information associated with the universal reference number. For example, where the merchant category code corresponds to hotels, the information may include a preference for a garden level room in close proximity to an ice machine. Further, in some arrangements, the information includes a payment token corresponding to the customer's preferred method of payment for hotels. As such, the merchant computing system 104 may assemble a transaction tailored to the customer's preferences (e.g., a garden level room next to an ice machine) after the merchant computing system 104 receives such information from the financial institution computing system 108 at 404.

After receiving the payment token and assembling a transaction, the merchant computing system 104 sends the transaction to an acquirer processor computing system 412 for processing at 403. Next, at step 405, the acquirer processor computing system 412 sends the payment token to the card network computing system 230 for processing a payment. The card network computing system 230 detokenizes the payment token, thereby resulting in the actual card number (PAN). At step 407, the card network computing system 230 sends the PAN to the financial institution computing system 108. The financial institution computing 108 then processes the transaction, for example, by approving the transaction based on the account status of the user (e.g., by confirming that the user has not exceed the credit limit of their credit card). The financial institution computing system 108 may then send an approval to the merchant computing system 104 via the card network computing system 230, the acquirer processor 412 (steps 409-413), and the payment to the merchant is made. Upon receiving the approval message, the merchant computing system 104 may generate a receipt for the user. In some embodiments, the receipt may be sent to the mobile device 110 electronically. In other embodiments, the receipt may be printed physically at the point of sale location.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A merchant computing system, the system comprising:
a merchant input/output assembly comprising a biometric scanner and a contactless card reader, the merchant input/output assembly configured to receive, via wireless communication, reference numbers from a physical payment card associated with a customer device;
a merchant database retrievably storing a plurality of reference numbers and customer information associated with each of the plurality of reference numbers, wherein the plurality of reference numbers includes (i) a first reference number of the physical payment card associated with a first level of security, and (ii) a second reference number of the physical payment card associated with a second level of security; and
a transaction circuit configured to:
receive, via a first channel in a chip of the physical payment card accessed using a merchant input/output assembly, a first authentication procedure and the first reference number, wherein the first authentication procedure is associated with the first level of security;
receive, via the merchant input/output assembly, first information to be authenticated to satisfy the first authentication procedure;
receive, via a second channel in the chip of the physical payment card accessed using the merchant input/output assembly, a second authentication procedure and the second reference number of the customer device, wherein the second authentication procedure is associated with the second level of security;
receive, via the merchant input/output assembly, second information to be authenticated to satisfy the second authentication procedure; and
present, via the merchant input/output assembly, a user interface relating to a transaction based on information stored in the merchant database.

2. The merchant computing system of claim 1, wherein the first reference number is stored in association with a first respective set of data relating to the customer device and the second reference number is stored in association with a respective second set of data relating to the customer device.

3. The merchant computing system of claim 2, wherein the transaction circuit is further configured to retrieve, from the merchant database based on the first reference number and the second reference number, responsive to confirming that the first authentication procedure and the second authentication procedure are satisfied, each of the first and second sets of data relating to the customer device.

4. The merchant computing system of claim 3, wherein the user interface presented via the merchant input/output assembly is based on the first and second respective sets of data relating to the customer device.

5. The merchant computing system of claim 1, wherein the merchant input/output assembly further comprises a display and a user input mechanism, wherein the transaction circuit is further configured to present, via the display of the merchant input/output assembly, a request for a personal identifier to satisfy the first authentication procedure, and wherein the first information to be authenticated to satisfy the first authentication procedure is the personal identifier received via the user input mechanism.

6. The merchant computing system of claim 1, wherein the second authentication procedure comprises two or more authentication procedures associated with the second level of security, and wherein the transaction circuit is further configured to present, via the merchant input/output assembly, a request for user biometric information to satisfy the second authentication procedure, wherein the second information is the user biometric information.

7. The merchant computing system of claim 1, wherein the transaction circuit is further configured to associate new or updated customer preferences with the first reference number or the second reference number received via the merchant input/output assembly, and store the new or updated customer preferences in the merchant database in association with the first reference number or the second reference number.

8. The merchant computing system of claim 1, wherein the payment card chip can communicate via a plurality of channels, each of the plurality of channels respectively corresponding to different references numbers including the first reference number and the second reference number, wherein the plurality of channels respectively correspond to a plurality of merchant types.

9. The merchant computing system of claim 1, wherein the transaction circuit is configured to perform at least one authentication procedure, and wherein the at least one authentication procedure includes verifying the authenticating information with the customer information in the merchant database.

10. The merchant computing system of claim 1, wherein the transaction circuit is configured to perform at least one authentication procedure, and wherein the at least one authentication procedure includes verifying the authenticating information with the customer information in the merchant database.

11. The merchant computing system of claim 1, wherein the transaction circuit is configured to perform at least one authentication procedure, wherein the merchant computing system further comprises a merchant network interface circuit configured to enable the merchant computing system to exchange data over a network, wherein the at least one authentication procedure includes verifying the authenticating information with information at a financial institution computing system over the network, and wherein the transaction circuit is further configured to retrieve the first and second sets of data relating to the customer device by transmitting an information request to the financial institution computing system over the network, and to receive the first respective set of data relating to the customer device and the respective second set of data relating to the customer device in response to the information request.

12. The merchant computing system of claim 1, wherein the customer information includes at least one token.

13. A financial institution computing system, the system comprising:
a financial institution database retrievably storing a plurality of reference numbers and customer information associated with each of the plurality of reference numbers, wherein the plurality of reference numbers include (i) a first reference number of a physical payment card associated with a first level of security, and (ii) a second reference number of the physical payment card associated with a second level of security, the first reference number stored in association with a first respective set of data relating to the customer device and the second reference number stored in association with a respective second set of data relating to the customer device, wherein the first reference number is stored with first known authentication data, and the second reference number is stored with second known authentication data;
a financial institution network interface circuit configured to enable the financial institution computing system to exchange data over a network; and
a data exchange circuit, the data exchange circuit configured to:
receive, via the network, responsive to a merchant computing device:
(i) accessing a chip of a physical payment card via a first channel using a contactless card reader of the merchant computing device,
(ii) presenting a request for a personal identifier via a display of the merchant computing device, and
(iii) receiving the personal identifier via a keyboard of the merchant computing device,
a first information request comprising the first reference number from the merchant computing device, the first information request including first authentication data;
verify the first authentication data with the first known authentication data stored in association with the first reference number in the financial institution database;
retrieve the first respective set of data associated with the first reference number from the financial institution database, the first respective set of data including customer device preferences;
receive, via the network, responsive to the merchant computing device:
(i) accessing the chip of the physical payment card via a second channel using the contactless card reader of the merchant computing device,
(ii) presenting a request for user biometric information via a display of the merchant computing device, and
(iii) receiving the user biometric information via a biometric scanner of the merchant computing device,
a second information request comprising the second reference number from the merchant computing device, the second information request including second authentication data;
verify the second authentication data with the second known authentication data stored in association with the second reference number in the financial database;

retrieve the second respective set of data associated with the second reference number from the financial institution database; and
transmit the first respective set of data and the second respective set of data to the merchant computing device, to cause the merchant computing device to present a user interface relating to a transaction at the merchant computing device based on the first respective set of data and the second respective set of data.

14. The financial institution computing system of claim 13,
wherein the first information request further includes a requested merchant category code;
wherein the financial institution database further stores a plurality of merchant category codes corresponding to a plurality of merchant types;
wherein the customer information in the financial institution database is associated with one of the plurality of reference numbers and at least one of the plurality of merchant category codes; and
wherein the data exchange circuit is configured to retrieve the customer information associated with both the reference number and the requested merchant category code in response to receiving a request for the customer information-from the merchant computing device.

15. The financial institution computing system of claim 13,
wherein the first information request or the second information request further comprises new or updated customer device preferences; and
wherein the data exchange circuit is further configured to associate the new or updated customer device preferences with the first reference number or the second reference number in the first information request or the second information request, respectively; and
wherein the data exchange circuit further stores the new or updated customer device preferences in the financial institution database.

16. The financial institution computing system of claim 15,
wherein the data exchange circuit is configured to receive the new or updated customer preferences from a first merchant computing device; and
wherein the data exchange circuit is configured to receive a second customer information request from a second merchant computing device, and to enable a second output relating to a second transaction by transmitting second customer information including the new or updated customer preferences to the second merchant computing device.

17. The financial institution computing system of claim 13,
wherein at least one of the first information request or the second information request includes transaction type information; and
wherein the data exchange circuit is further configured to determine whether to request authentication data from the customer based on the transaction type information received.

18. The financial institution computing system of claim 13, further comprising a token database storing information relating to a plurality of tokens, wherein the customer information includes at least one of the plurality of tokens from the token database, wherein the at least one of the plurality of tokens relates to a preferred method of payment, wherein at least one of the first information request or the second information request includes a purchase amount, and wherein the data exchange circuit is configured to authorize a purchase transaction based on the purchase amount and the preferred method of payment.

19. A method, comprising:

associating, by a data exchange circuit, first respective data comprising customer device preferences with a first reference number of a physical payment card and with first known authentication data for the first reference number;

associating, by the data exchange circuit, second respective data different from the first respective data with a second reference number of the physical payment card and with second known authentication data for the second reference number, and storing the association of the second respective data with the second reference number and the second known authentication data for the second reference number in the financial institution database;

receiving, by the data exchange circuit, via the network, responsive to a merchant computing device:
 (i) accessing a chip of a physical payment card via a first channel using a contactless card reader of the merchant computing device,
 (ii) presenting a request for a personal identifier via a display of the merchant computing device, and
 (iii) receiving the personal identifier via a keyboard of the merchant computing device, a first information request comprising the first reference number from the merchant computing device, the first information request including first authentication data including the personal identifier;

authenticating, by the data exchange circuit, the personal identifier received in the authentication data with the first known authentication data stored in association with the first reference number in the financial institution database;

retrieving, by the data exchange circuit, the first respective set of data associated with the first reference number, the first respective set of data including the customer device preferences;

receiving, by the data exchange circuit, via the network, responsive to the merchant computing device:
 (i) accessing the chip of the physical payment card via a second channel using the contactless card reader of the merchant computing device,
 (ii) presenting a request for user biometric information via a display of the merchant computing device, and
 (iii) receiving the user biometric information via a biometric scanner of the merchant computing device, a second information request comprising the second reference number from the merchant computing device, the second information request including second authentication data including the user biometric information;

authenticating, by the data exchange circuit, the user biometric information received in the second authentication data with the second known authentication data stored in association with the second reference number in the financial database;

retrieving, by the data exchange circuit, the second respective set of data associated with the second reference number from the financial institution database; and transmitting, by the data exchange circuit, the first respective set of data and the second set of data to the merchant computing device, to cause the merchant computing device to present a user interface relating to a transaction at the merchant computing device based on the first respective set of data and the second respective set of data.

20. The method of claim 19, further comprising performing, by the data exchange circuit, at least one fraud check in response to the first information request or the second information request, wherein the data exchange circuit does not transmit the first respective set of data or the second respective set of data if the at least one fraud check indicates a potential incidence of fraud.

\* \* \* \* \*